(12) United States Patent
Bhimanaik

(10) Patent No.: US 9,979,720 B2
(45) Date of Patent: *May 22, 2018

(54) PASSWORDLESS STRONG AUTHENTICATION USING TRUSTED DEVICES

(71) Applicant: Amazon Technologies, Inc., Seattle, WA (US)

(72) Inventor: Bharath Kumar Bhimanaik, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 80 days.

This patent is subject to a terminal disclaimer.

(21) Appl. No.: 14/882,830

(22) Filed: Oct. 14, 2015

(65) Prior Publication Data

US 2016/0036809 A1  Feb. 4, 2016

Related U.S. Application Data

(63) Continuation of application No. 14/101,697, filed on Dec. 10, 2013, now Pat. No. 9,178,890, which is a
(Continued)

(51) Int. Cl.
*G06F 17/30* (2006.01)
*H04L 29/06* (2006.01)
*H04L 9/32* (2006.01)
*G06F 21/35* (2013.01)
*G06F 21/36* (2013.01)

(52) U.S. Cl.
CPC .......... *H04L 63/0853* (2013.01); *G06F 21/35* (2013.01); *G06F 21/36* (2013.01); *H04L 9/321* (2013.01); *H04L 63/08* (2013.01); *H04L 63/10* (2013.01); *H04L 63/102* (2013.01); *H04L 63/18* (2013.01); *H04L 65/60* (2013.01)

(58) Field of Classification Search
CPC ... G06F 21/36; G06F 2221/2103; G09C 1/04; H04L 63/08; H04L 63/10; H04L 63/102
See application file for complete search history.

(56) References Cited

U.S. PATENT DOCUMENTS 7,328,844 B2 * 2/2008 Workens ................ G06Q 20/10
                                                      235/379
7,822,204 B2 * 10/2010 Yoshida ................ H04L 1/0045
                                                      380/255
(Continued)

OTHER PUBLICATIONS

RSA Securities "Enhancing One-Time Passwords for Protection Against Real-Time Phishing Attacks", 2004. RSA Security Inc. pp. 1-10.

*Primary Examiner* — Abiy Getachew
(74) *Attorney, Agent, or Firm* — Thomas | Horstemeyer, LLP

(57) ABSTRACT

A code for accessing a resource having a customer account associated therewith is presented via a secondary device, and authentication data indicative of the code that was presented is received from a primary device. The primary device is identified as a trusted device associated with the customer account responsive to receiving the authentication data therefrom, and the secondary device is authenticated for access to the resource responsive to identification of the primary device as the trusted device associated with the customer account.

20 Claims, 7 Drawing Sheets

Related U.S. Application Data continuation of application No. 13/228,192, filed on Sep. 8, 2011, now Pat. No. 8,627,438.

(56) References Cited

U.S. PATENT DOCUMENTS

| | | | |
|---|---|---|---|
| 8,627,438 B1 | 1/2014 | Bhimanaik | |
| 8,949,956 B1* | 2/2015 | Baldwin | G06Q 10/107 709/206 |
| 2006/0025222 A1* | 2/2006 | Sekine | G07F 17/32 463/42 |
| 2007/0067828 A1 | 3/2007 | Bychkov | |
| 2008/0044011 A1 | 2/2008 | Yoshida et al. | |
| 2008/0172340 A1 | 7/2008 | Karlsson | |
| 2010/0066507 A1 | 3/2010 | Myllymaki | |
| 2010/0287485 A1* | 11/2010 | Bertolami | G06F 3/011 715/764 |
| 2012/0131348 A1 | 5/2012 | Skubic et al. | |
| 2013/0219479 A1* | 8/2013 | DeSoto | H04W 12/06 726/6 |
| 2014/0310416 A1* | 10/2014 | Durbha | H04L 47/70 709/225 |

* cited by examiner

PASSWORDLESS STRONG AUTHENTICATION USING TRUSTED DEVICES

CROSS-REFERENCE TO RELATED APPLICATION

This application is a continuation of copending U.S. utility application entitled, "PASSWORDLESS STRONG AUTHENTICATION USING TRUSTED DEVICES," having Ser. No. 14/101,697, filed Dec. 10, 2013, which is a continuation of copending U.S. utility application entitled, "PASSWORDLESS STRONG AUTHENTICATION USING TRUSTED DEVICES," having Ser. No. 13/228,192, filed Sep. 8, 2011, issuing on Jan. 7, 2014 as U.S. Pat. No. 8,627,438, both of which are entirely incorporated herein by reference.

BACKGROUND

Consumers may use computer network systems, such as the Internet, to access a variety of data, applications, and services, generally referred to herein as online resources.

The methodology employed to reliably verify the identity of a consumer or other user of a computer network system prior to allowing the user access to system resources is generally referred to as authentication. For example, the user may send a username and password to a remote server in order to authenticate the user for access to the resources provided thereby. Cryptography can be used to preserve the confidentiality of the transmitted username and password when authenticating the user.

However, such password-based authentication can be somewhat cumbersome to the user. For example, as each online resource typically requires its users to have unique usernames, a user may be unable to use the same username to access multiple online resources if that username is already in use by another user of any of the online resources. As such, a user may be required to remember several different usernames in order to access different online resources, as well as to keep track of which username was used to set up the account for each online resource. Likewise, each online resource may have different rules as to the types of character strings that may be used as passwords. For example, some websites may require a password to have more than a particular number of characters (e.g. more than 6 characters), others may require a password to be a combination of alphabetic and numeric characters, and still others may require a password to include at least one special character (such as !, @, #, $, %, &, etc.). Thus, in addition to remembering different usernames, a user may also be required to remember several different passwords in order to access different online resources, as well as to keep track of which username-password pair applies to each account.

The use of usernames and passwords for authentication may also present problems from a security perspective. For example, password-based authentication may be vulnerable to keystroke logging applications (where a hidden application records the keystrokes of a user) or phishing attacks (where a user is tricked into revealing his username and password by a masquerading entity). Also, should a user's password for an online resource be compromised by the above or other security issues, the user may be required to create and remember yet another password, thereby compounding the above-mentioned problems associated with remembering and keeping track of different usernames and password combinations for different accounts.

DETAILED DESCRIPTION

Various embodiments described herein provide methods, systems, and devices for providing alternate and more secure ways for authenticating customers to access online resources, instead of (or in addition to) entry of a username and password. As used herein, an online resource may refer to any content that is accessible via a network, such as web-based or cloud-based data, applications, and services. Examples of online resources may include, but are not limited to, web-based or cloud based data storage services, social networking applications, shopping services, microblogging accounts, payment services, multimedia content delivery services (such as online magazine, music, video, etc.) and financial services (such as credit/banking services).

In particular, embodiments described herein allow customers to sign-in or login to one or more accounts associated with online applications or services using a trusted device (such as a mobile phone, a smartphone, a tablet, or other portable electronic terminal) that has been previously registered or linked to the account(s). For example, a visible code may be displayed on a desktop computer alongside (or instead of) a password-based sign-in window that is typically used to access a customer account for a web-based service. A mobile phone that has been previously registered with the same customer account can scan the displayed code using its camera, and can send the scanned code to a web server that provides the web-based service. In response to receiving the scanned code, the web server can identify the mobile phone as being associated with the customer account based on the prior registration, and can thereby authenticate the desktop computer for access to the web-based service based on recognition of the scanned code. Thus, the desktop computer may be automatically signed-in to the web-based service based on recognition of the mobile phone as a trusted device, without requiring the customer to enter his username and password.

Online resources that can be accessed in accordance with embodiments described herein may be accessible using a web browser executing on a computer, as well as with native applications executing on non-traditional computing devices, such as televisions or external set-top boxes connected to a television. Embodiments described herein therefore allow an unregistered device (or a device that is otherwise unknown to an online application or service) to access a customer account responsive to receiving authenticating information from a trusted device that has been previously registered with (or is otherwise already associated with) the customer account. Accordingly, embodiments described herein may reduce demands on the customer (e.g., for remembering usernames and passwords) as well as obviate many security risks as compared to traditional password-based authentication methods.

Overall Architecture for Using a Trusted Device to Authenticate Another Device

Figure 1:
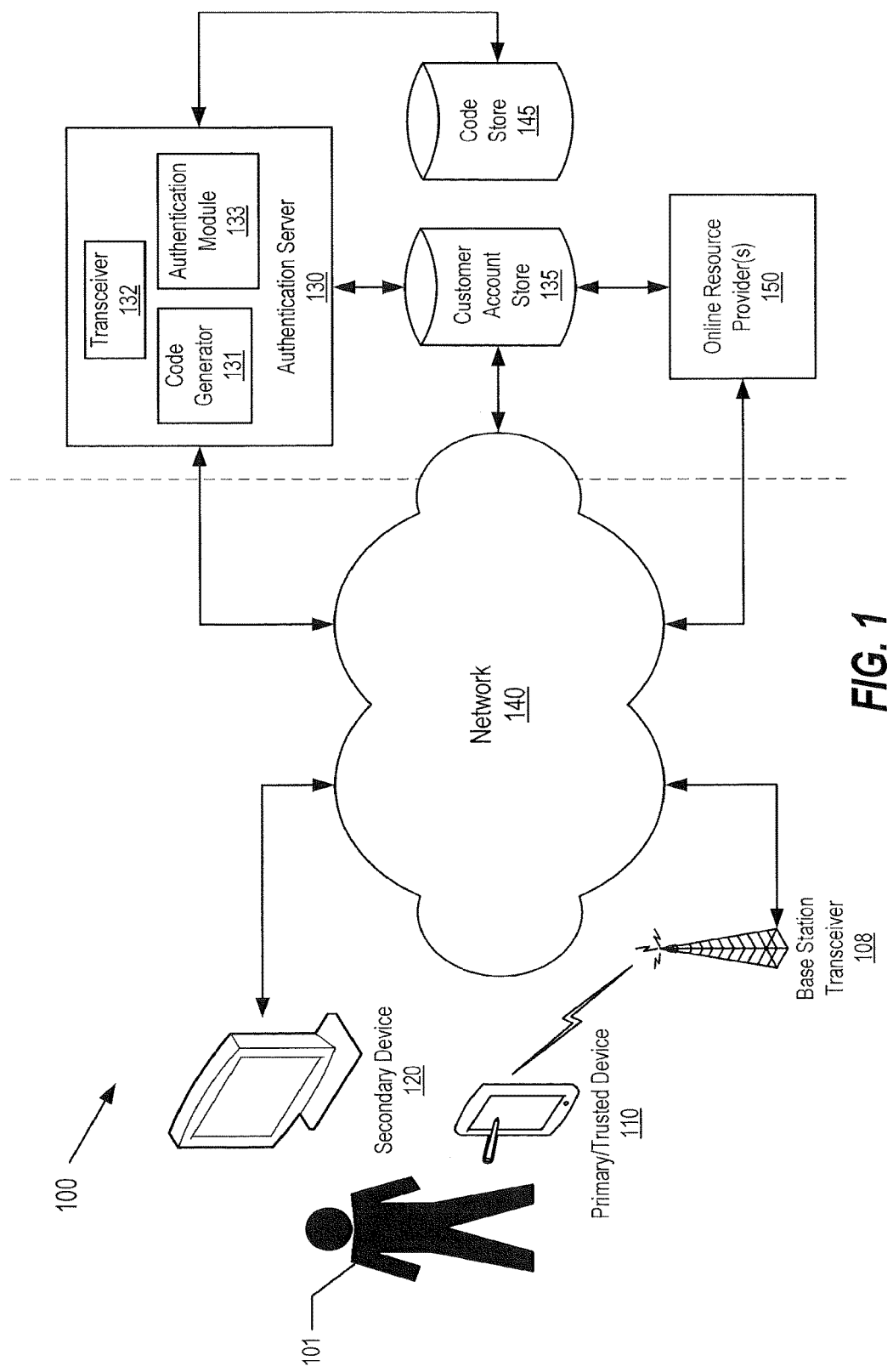
FIG. 1 is a block diagram of systems, devices, methods and computer program products for authenticating a customer of an account-based online resource using a trusted device, according to various embodiments described herein.

FIG. 1 is a block diagram of systems, devices, methods, and computer program products for authenticating a customer for access to account-based online resources using a trusted device, according to various embodiments described herein. As used herein, the term "account-based online resource" may refer to network-accessible data, applications, services, or combinations thereof that require a customer account or subscription to access the content or services provided thereby. Referring now to FIG. 1, a communications environment or system 100 may include a mobile electronic device 110 and another electronic device 120 that are accessible to a user 101 and are configured for communication via a network 140. The mobile device 110 (also referred to herein as a "primary device" associated with the user 101) may be a wireless communication terminal, such as a cellular telephone, smartphone, electronic book reader, tablet, or other portable electronic terminal that is configured to access the network 140 over a wireless connection, for example, via a base station transceiver 108. The electronic device 120 (also referred to herein as a "secondary device" accessible to the user 101) may be a wired or wireless communication terminal, such as a desktop computer, laptop computer, smartphone, tablet, network-ready television, set-top box, and the like, and may be configured to access the network 140 via a wired or wireless connection. The secondary device 120 may be configured to access the network using a web browser or a native application executing thereon. In some embodiments, the mobile device 110 may have a physical size or form factor that enables it to be easily carried or transported by a user 101, while the electronic device 120 may have a larger physical size or form factor than the mobile device 110.

The devices 110 and 120 are configured to access online resources, including web-based or cloud-based data, applications, and services, via the network 140. The network 140 may represent one or more of a local area network (LAN), a wide area network (WAN), an Intranet or other private network that may not be accessible by the general public, or a global network, such as the Internet or other publicly accessible network. The network 140 provides communication between the devices 110 and 120 and one or more online resource providers 150 (such as web servers) configured to provide the aforementioned online data, applications, or services. The online resource provider 150 may include a network transceiver, processor, memory, and or other circuitry configured to coordinate and manage operations for delivering online resources to the devices 110 and 120 via the network 140. While illustrated as a single entity in FIG. 1, it will be understood that, in some embodiments, the online resource provider 150 may represent one or more physical or virtual servers that are configured to deliver online resources to the devices 110 and 120. Examples of the online resources provided by the online resource provider 150 may include, but are not limited to, web-based or cloud based data storage services, social networking applications, shopping services, microblogging accounts, payment services, multimedia content delivery services (for delivery of online magazines, music, video, etc.) and financial services (such as credit/banking services).

The online resource provider 150 may require a subscription or customer account in order to access each of the different online resources provided thereby. As such, the system 100 also includes a customer account store 135 that contains customer account information for one or more customers, such as the user 101. The customer account store 135 may be embodied in nonvolatile memory, such as flash, magnetic, or optical rewritable nonvolatile memory. The customer account information stored in the customer account store 135 may include a listing of customer accounts and online resources to which the accounts correspond. The customer accounts may include information identifying each user or customer that has registered for each online resource, such as the customer's name, mailing address, e-mail address, phone number, payment. The customer account information may also include information that may be used to verify or authenticate the customer to access the account. For example, for each customer account, the customer account information may include a username and a password selected by the customer to access the account. However, as noted above, such password-based authentication may be cumbersome for a customer, and may also be vulnerable from a security standpoint.

In accordance with some embodiments described herein, the customer account information stored in the customer account store 135 further includes registration information identifying a trusted device associated with each account. For example, the user 101 may download and execute an application on the primary device 110 that allows the user to register or otherwise link the primary device 110 to one or more of the user's accounts for different online resources. The primary device 110 may transmit this registration information to a server associated with an online resource (such as the online resource provider 150 that delivers the online resource or an authentication server 130, as discussed below) in the form of a registration request that identifies the user 101 and the users' customer account. In response, the online resource provider 150 may register the primary device 110 as a trusted device associated with the customer account, and may store an indication of this association in the customer account store 135. For example, the customer account store 135 may include a lookup table including a key values and parameters indicative of a plurality of customer accounts for each online resource, and one or more trusted devices associated each customer account.

Still referring to FIG. 1, the system further includes an authentication server 130 configured to authenticate electronic devices (such as the devices 110 and 120) to access the online resource(s) provided by the online resource provider 150. The authentication server 130 may include a network transceiver, processor, memory, and or other circuitry configured to coordinate and manage authentication operations via the network 140. In particular, as illustrated in FIG. 1, the authentication server 130 includes a code generator 131 and an authentication module 133. The code generator 131 and the authentication module 133 may be embodied in hardware and/or in software that runs on a processor, such as a commercially available or custom microprocessor.

The code generator 131 is configured to provide a code that may be used to access an online resource having an associated customer account. The code may be any unique identifier, such as a randomly generated character string, and may be represented by a one-dimensional or multi-dimensional machine-readable code, such as a QR code, in some embodiments. The code may be generated in response to detecting an attempt by the secondary device 120 to access the online content provided by the online resource provider 150. For example, the code generator 131 may generate the code in response to receiving a request to access an online resource provided by the online resource provider 150 using a trusted device. In other embodiments, the code generator 131 may retrieve or select the code from a code store 145 that stores a plurality of previously-generated codes. The code provided by the code generator 131 may also include addressing information for the authentication server 130, such as an IP address or network ID. The authentication server 130 also includes a network transceiver 132 that is configured to transmit or issue the code provided by the code generator 131 to the online resource provider 150 for presentation via the secondary device 120, for example, in response to detecting the attempt by the secondary device 120 to access the online resource. The code store 145 may also store information listing currently or previously issued codes, the authentication status of each issued code, and the online resource to which each issued code corresponds, thereby allowing re-use of codes.

As described in greater detail below with reference to FIGS. 2 and 3, the secondary device 120 may display or otherwise present the code received from the transceiver 132 to provide a method for authentication of the secondary device 120 using the primary device 110, without receiving a username or password from the secondary device 120. More particularly, the primary device 110 may scan or otherwise record in the code presented by the secondary device 120, and may transmit authentication data indicative of the code to the authentication server 130 using the network ID, IP address, or other information identifying the authentication server 130 that is included in the code. The authentication data may identify the primary device 110, and may indicate that the code previously provided to the secondary device 120 was recorded by the primary device 110. In some embodiments, the primary device 110 may locally scan or capture a code displayed by the secondary device 120 (via the screen of the secondary device 120) or transmitted by the secondary device 120 (via Bluetooth or near-field communication), and may send the captured code or authentication data derived from the captured code to the authentication server 130. For example, upon registration, the authentication server 130 may assign and transmit to the primary device 110 a particular encryption key for use in future authentication operations. As such, after scanning the code presented by the secondary device, the primary device 110 may derive a security value from the scanned code, may use the assigned key to encrypt or "sign" the security value to provide the authentication data, and may transmit the authentication data to the authentication server 130, which may recognize that the code was locally scanned by the primary device 110 based on the "signature" present in the authentication data.

The authentication data received from the primary device 110 can be used by the authentication server 130 to authenticate the secondary device 120 for access to a customer accounts associated with the online content provided by the online resource provider 150. In particular, in response to receiving the authentication data from the mobile device 110 via the transceiver 132, the authentication module 133 is configured to access the customer account store 135 in order to identify the primary device 110 as a trusted device associated with the customer account. In particular, based on information in the authentication data identifying the primary device 110, the authentication module 133 accesses a lookup table stored in the customer account store 135, where the lookup table includes key values and parameters indicating the trusted device(s) that have been previously registered with each customer account for the desired online resource. As such, the authentication module 133 may identify the primary device 110 as a trusted device associated with a particular customer account based on a prior registration event linking or otherwise associating the primary device with the customer account. In some embodiments, the registration event may occur prior to or concurrently with receiving the authentication data from the primary device 110.

In response to identifying the primary device 110 as a trusted device associated with the customer account, the authentication server 130 may authenticate the secondary device 120 for access to the desired online resource. For example, the authentication module 133 may provide an indication to the online resource provider 150 that the secondary device 120 is permitted access to the online resource responsive to receiving the authentication data from the primary device 110. In particular, the authentication module 133 may mark the security value from the code that was presented by the secondary device 120 as being authenticated, and may store an indication thereof in the customer account store 135 or in the code store 145. Upon verifying authentication of the secondary device 120, the online resource provider 150 may automatically log the secondary device 120 into the customer account associated with the online resource provided thereby. Accordingly, embodiments described herein may allow for authentication of the secondary device 120 without receiving customer identification information, such as a username and password, from the secondary device 120.

In some embodiments, the system 100 may be further configured to allow for multi-factor authentication of the secondary device 120 via the primary device 110. For example, responsive to receiving the authentication data indicative of the code presented by the secondary device 120, the authentication server 130 may instruct the primary device 110 or the secondary device 120 to display a prompt for additional authentication data. In particular, as customer accounts associated with some online resources hosted by the online resource provider 150 (such as banking or other financial services) may contain more sensitive information than others (such as streaming video services), the authentication server 130 may request additional authentication data in order to authenticate the secondary device 120 for access to more sensitive accounts. Likewise, the user 101 may associate multiple devices having different levels of trust with a particular customer account in the customer account store 135, and the online resource provider 150 may require additional authentication data from devices having a lower level of trust. For example, if the primary device 110 is registered as a trusted device with the user's corporate account, the user 101 may also register a personal device (such as a personal mobile phone) with the corporate account; however, additional authentication data may be required from the personal device to authenticate the secondary device 120 for access to the corporate account, based on its lower level of trust relative to the primary device 110. The additional authentication data may be requested, for example, in the form of a username and password, a personal identification number (PIN) or even a physical authentication token, in addition to the data indicative of the code displayed by the secondary device 120. As such, for accounts associated with more sensitive online content (or for devices having a lower level of trust), the authentication server 130 may be configured to permit the secondary device 120 to access an account hosted by the online resource provider 150 only in response to receiving both the initial authentication data (indicative of the code presented by the secondary device 120) and the additional authentication data discussed above.

Embodiments described herein may also be used to facilitate transactions with a point-of-sale (POS) terminal, such as those used in retail stores or even in parking meters. For example, the secondary device 120 may be a network-accessible parking meter configured to present the code described herein to the primary device 110. The primary device 110 can thereby record and transmit the code to the authentication server 130 to authenticate the parking meter 120 to access the user's account for a parking service. Once logged-in to the user's account, the user 101 may use the parking meter 120 to charge the parking fees to the user's account, without entering customer identification information into the parking meter.

Although FIG. 1 illustrates an example communications environment 100 in accordance with some embodiments, it will be understood that the present disclosure is not limited to such a configuration but is intended to encompass any configuration capable of carrying out the operations described herein. For example, although primarily discussed above with reference to a single authentication server 130 and a single online resource provider 150, some embodiments may include a plurality of distributed network elements that collectively perform the operations described herein to provide for passwordless authentication of a customer using a trusted device. Likewise, while illustrated as separate entities, it will be understood that the operations performed by the online resource provider 150 and the authentication server 130 may be performed by a single entity in some embodiments. More generally, various functionality described herein with reference to separate functional elements may be combined within a single functional element and, vice versa, functionality described herein in single functional elements can be carried out by a plurality of separate functional elements.

Use Case Example—Consumer Access to Website Via PC

Figure 2:
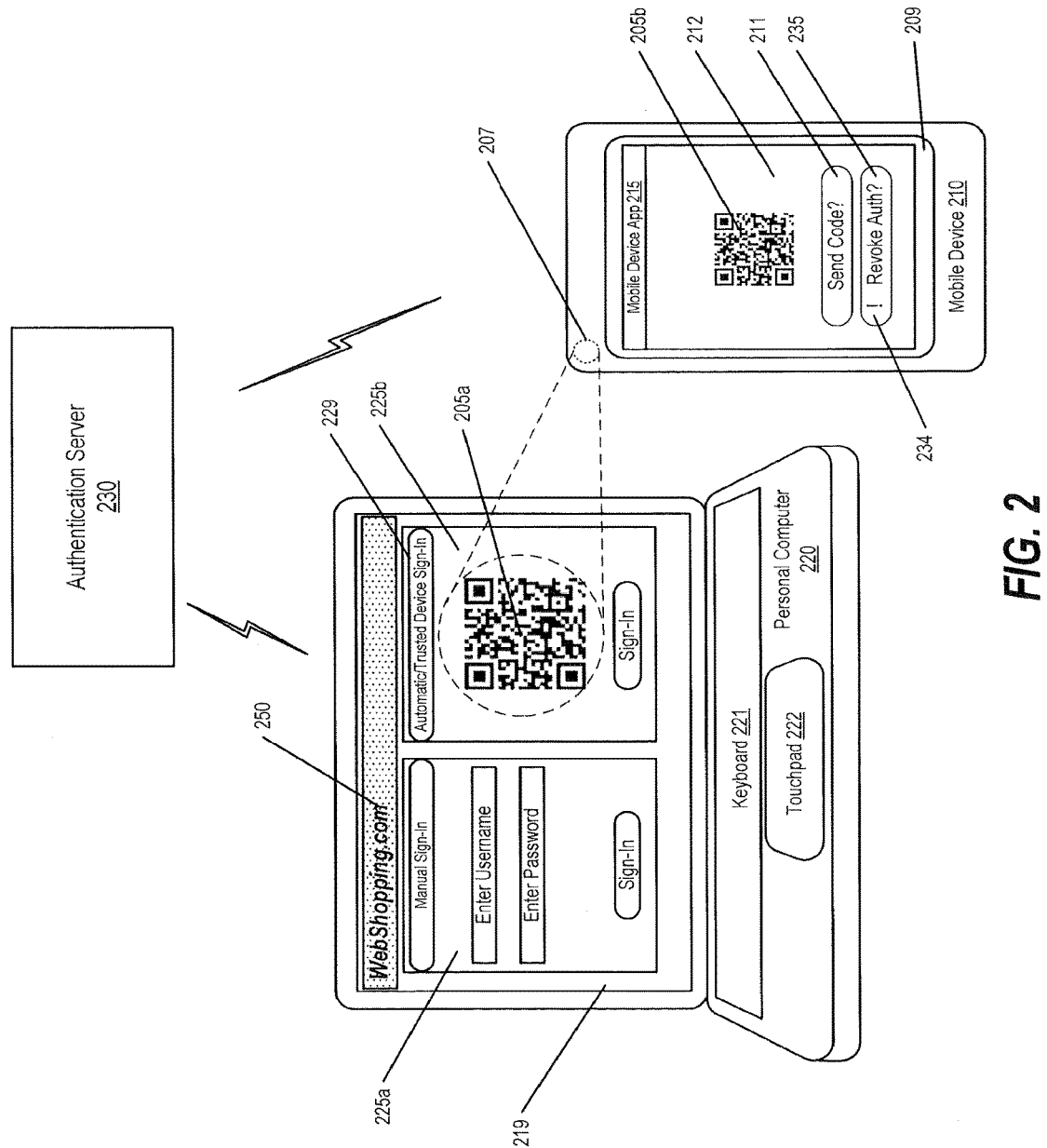
FIG. 2 is a block diagram illustrating authentication of a customer of an account-based online resource using a trusted device, according to some embodiments described herein.

FIG. 2 illustrates authentication of a personal computer 220 for access to an online resource using a trusted mobile device according to some embodiments described herein. The mobile device 210 may be a mobile terminal, smartphone, electronic book reader, or tablet, in some embodiments. Referring now to FIG. 2, a user (such as the user 101 of FIG. 1) may download and launch a mobile device application 215 using the mobile device 210. The mobile device application 215 may present a user interface 212 via a display 209 of the mobile device 210. The user interface 212 may provide one or more on-screen prompts that allow the user to register or link the mobile device 210 with a particular customer account for a web-based shopping service (for example, as provided by the online resource provider 150 of FIG. 1). The data associating the mobile device 210 with the customer account for the shopping service may be stored, for example, in a customer account data store (such as the customer account store 135 of FIG. 1).

Using a web browser 219 executing on the personal computer 220, the user may attempt to access the web-based shopping service (illustrated in FIG. 2 as a fictitious service called "WebShopping.com") provided by a online resource provider. The user interface 250 of the shopping service includes two options for authentication: a manual sign-in area 225a (where the user can enter a username and password), and an automatic sign-in area 225b (where the user can sign-in using a trusted device). The automatic sign-in area 225b of the user interface 250 also displays a QR code 205a for use in the automatic sign-in process. The QR code 205a may represent a unique or randomly generated security token (such as a pseudo-random number (PRN) sequence) that is provided by an authentication server 230 in response to detecting the attempt by the personal computer 220 to access the online shopping service. In some embodiments, the QR code 205a may be generated and displayed responsive to receiving a request from the personal computer 220 expressing a desire to access the online shopping service without entry of customer identification information. For example, the user interface 250 may include an option or on-screen button (or other user activated interface) 229 for signing-in using the automatic sign-in process instead of manual sign-in process. Responsive to selection of this button 229, the browser 219 (or the online resource provider) may transmit a request to the authentication server 230, and the authentication server 230 may generate and transmit the code 205a to the online resource provider for display by the browser 219 in the automatic sign-in area 225b of the user interface 250.

Still referring to FIG. 2, once the QR code 205a is displayed on the personal computer 220 in the automatic sign-in area 225b, the user can launch the mobile device application 215 on the mobile device 210, and can scan the displayed QR code 205a using a camera 207 of the mobile device 210. In some embodiments, the user interface 250 may display on-screen directions prompting the user to scan the displayed QR code 205a using a trusted device that is registered with the user's account for the online shopping service. An indication 205b of the QR code can be displayed in the user interface 212 of the mobile device 210 responsive to scanning the code 205a using the camera 207. The user interface 212 of the mobile device application 215 may also display a button 211 asking the user to confirm that the code has been scanned for the automatic sign-in process. Additional options may also be presented via the user interfaces 212 or 250, such as options to limit or extend the duration of time for which the personal computer 220 is authenticated to access the online shopping service.

In response to selection of the button 211, the mobile device application 215 transmits authentication data to the authentication server 230, for example, based on addressing information (such as a network ID or IP address) included in the QR code 205a. The authentication data is generated by the mobile device 210 from the security token included in the QR code 205a. For example, the authentication data may be generated by the mobile device 210 by encrypting the security token presented in the QR code 205a using an encryption key previously provided to the mobile device 210 by the authentication server 230 (for example, during the registration process). The authentication data therefore includes information that identifies the mobile device 210 and indicates that the QR code 205a displayed on the personal computer 220 was scanned by the mobile device 210 based on the encryption of the authentication data with the assigned key.

Upon receiving the authentication data, the authentication server 230 verifies that the mobile device 210 is a trusted device associated with the customer account, for example, by accessing a lookup table in a customer account data store (such as the customer account store 135). Once the mobile device 210 has been identified as a trusted device, the authentication server 230 marks the token provided in the QR code 205a as authenticated, and may store an indication of the same in the customer account data store or in a code data store (such as the code store 145). The online resource provider repeatedly queries the appropriate data store or otherwise verifies with the authentication server 230 that the code 205a has been authenticated, and in response, transmits cookies to the web browser 219 to set up a session or authentication state. As such, the personal computer 220 is authenticated and automatically signed-in to the customer account of the online shopping service based on prior registration of the mobile device 210 as a trusted device for the customer account, without entry of a username or password.

In some embodiments, the user interface 212 of the mobile device application 215 also provides an option or on-screen button 235 for revoking the access of the personal computer 220 to the online shopping service. In particular, upon selection of the button 235, the mobile device 210 may transmit a notification to the authentication server 230 indicating a desire to revoke the access of the personal computer 220, and the authentication server 230 may thereafter deny the personal computer 220 access to the online shopping service, for example, by automatically logging out the personal computer 220 from the customer account in response to the notification. Also, the authentication server 230 may transmit an alert message to the mobile device 210 in the event that a problem or security issue with the customer account is detected. For example, the online resource provider or the authentication server 230 may detect an attempt to access the customer account by another device while the personal computer 220 is signed-in to the customer account. The alert 234 may be displayed via the user interface 212 of the mobile device application 215, and the mobile device 210 may transmit a message to revoke all access to the customer account responsive to selection of the button 235. It will be understood that, although illustrated by way of example as being performed by the mobile device application 215, the operations for revoking the access of the personal computer 220 may be presented via and performed by other devices as well. For example, in some embodiments, the option 235 to revoke the access of the personal computer 220 may be presented via the browser 219 executing on the personal computer 220; thus, the notification to revoke access may be received from the personal computer 220 itself. Likewise, a user may login to his account using another computer, such as a home desktop computer (whether by manual sign-in or trusted device sign-in), and the notification to revoke the access of the personal computer 220 may be received from the desktop computer responsive to presentation of the option 235 thereby.

Embodiments described herein may also be used in conjunction with third-party online resource providers. For example, once the personal computer 220 has been authenticated for access to the customer's WebShopping.com account, the personal computer 220 may be used to browse AwfulBuy.com, another fictitious web-based shopping service. The online resource provider hosting the AwfulBuy.com site may request a code or token from the online resource provider hosting the WebShopping.com site, and the online resource provider hosting the WebShopping.com site may send the token or code to the online resource provider hosting the AwfulBuy.com site indicating that the personal computer 220 has been authenticated to access the customer's WebShopping.com account. As such, the customer's WebShopping.com account may be used to shop AwfulBuy.com without providing customer identification information to the online resource provider hosting the AwfulBuy.com site.

Use Case Example—Consumer Access to Online Streaming Via TV/STB

Figure 3:
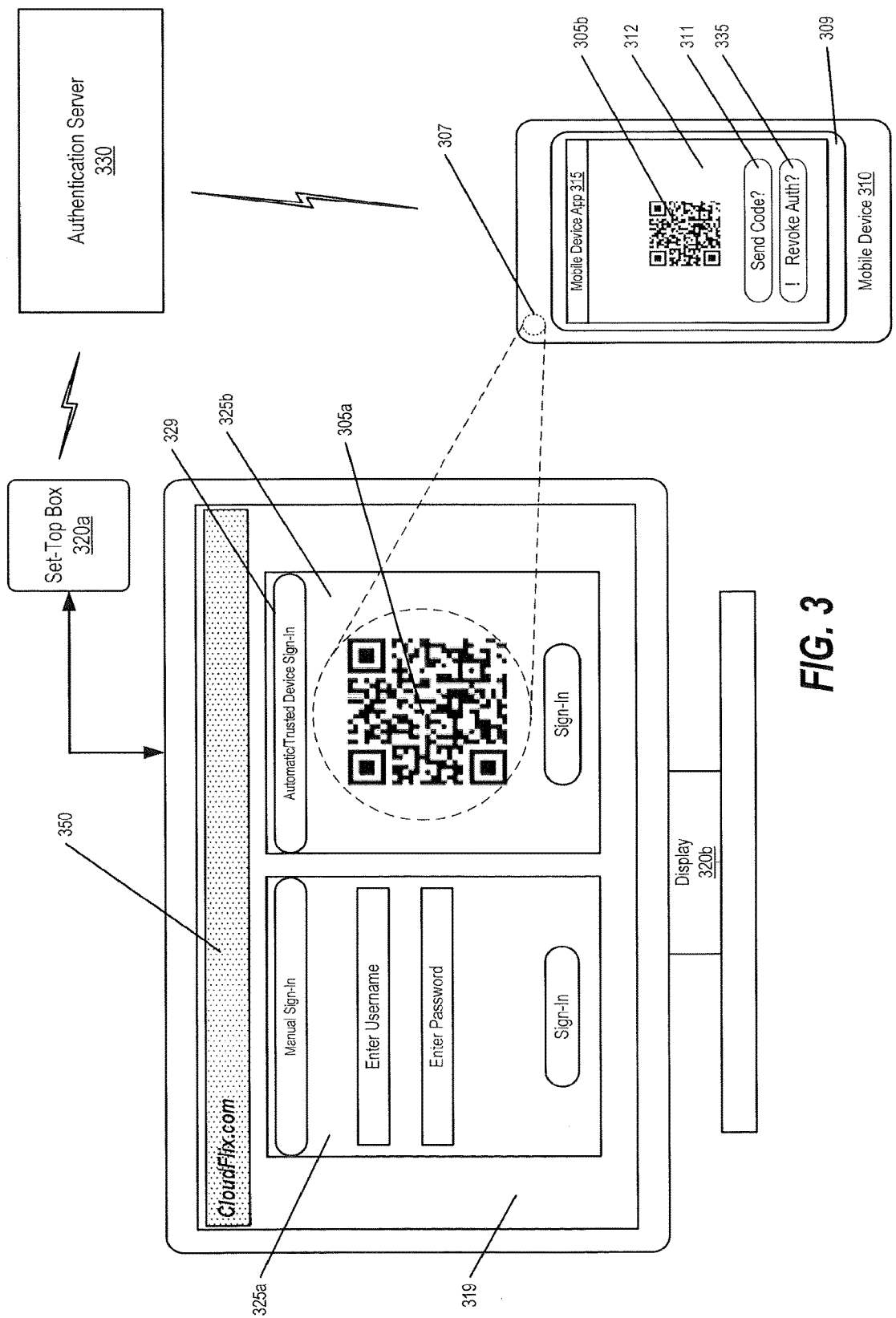
FIG. 3 is a block diagram illustrating authentication of a customer of an account-based online resource using a trusted device, according to further embodiments described herein.

FIG. 3 illustrates authentication of a set-top box (STB) 320a for access to an online resource using a trusted mobile device according to some embodiments described herein. The STB 320a may be configured to stream audio and video from an online resource provider, and may be connected to an external display 320b, such as monitor or television. The mobile device 310 may be a mobile terminal, smartphone, electronic book reader, or tablet, in some embodiments. Referring now to FIG. 3, a user (such as the user 101 of FIG. 1) may download and launch a mobile device application 315 using the mobile device 310. The mobile device application 315 may present a user interface 312 via a display 309 of the mobile device 310. The user interface 312 may provide one or more on-screen prompts that allow the user to register or link the mobile device 310 with a particular customer account for cloud-based streaming entertainment service (for example, as provided by the online resource provider 150 of FIG. 1). The data associating the mobile device 310 with the customer account for the streaming service may be stored, for example, in a customer account data store (such as the customer account store 135 of FIG. 1).

Using a native application 319 executing on the STB 320a, the user may attempt to access the cloud-based streaming entertainment service (illustrated herein as a fictitious service called "CloudFlix") provided by an online resource provider. The user interface 350 of the streaming service includes two options for authentication: a manual sign-in area 325a (where the user can enter a username and password), and an automatic sign-in area 325b (where the user can sign-in using a trusted device). The automatic sign-in area 325b of the user interface 350 also displays a QR code 305a for use in the automatic sign-in process. The QR code 305a may represent a unique or randomly generated security token that is provided by an authentication server 330 in response to detecting the attempt by the STB 320a to access the streaming service. In some embodiments, the QR code 305a may be generated and displayed responsive to receiving a request from the STB 320a indicating a desire to access the service without entry of customer identification information. For example, the user interface 350 may display an option or on-screen button 329 for signing-in using the automatic sign-in process instead of the manual sign-in process. Responsive to selection of this option 329, the native application 319 may transmit a request to the authentication server 330, and the authentication server 330 may generate and transmit the QR code 305a to the online resource provider for display by the native application 319 in the automatic sign-in area 325b of the user interface 350.

Still referring to FIG. 3, once the QR code 305a is displayed in the automatic sign-in area 325b, the user can launch the mobile device application 315 on the mobile device 310, and can scan the displayed QR code 305a using a camera 307 of the mobile device 310. In some embodiments, the user interface 350 may display on-screen directions prompting the user to scan the displayed QR code 305a using a trusted device that is registered with the user's account for the cloud-based streaming service. An indication 305b of the QR code may be displayed by the user interface 312 responsive to scanning the QR code 305a using the camera 307. The user interface 312 of the mobile device application 315 may also display a button 311 asking the user to confirm that the code has been scanned for the automatic sign-in process. Additional options may also be presented via the user interfaces 312 or 350, such as options to limit or extend the duration of time for which the STB 320a will be authenticated to access the online streaming service.

In response to selection of the button 311, the mobile device application 315 transmits authentication data to the authentication server 330, for example, based on contact information (such as a network ID or IP address) included in the QR code 305a. The authentication data is generated by the mobile device 310 from the security token included in the QR code 305a. For example, the authentication data may be generated by the mobile device 310 by encrypting the security token presented in the QR code 305a using an encryption key previously provided to the mobile device 310 by the authentication server 330 (for example, during the registration process). The authentication data can therefore include information that identifies the mobile device 310 and indicates that the QR code 305a presented via the display 320b was locally scanned by the mobile device 310.

Upon receiving the authentication data, the authentication server 330 verifies that the mobile device 310 is a trusted device associated with the customer account, for example, by accessing a lookup table in the customer account data store (such as the customer account store 135). Once the mobile device 310 has been identified as a trusted device, the authentication server 330 marks the token provided in the QR code 305a as authenticated, and may store an indication of the same in a customer account data store or a code data store (such as the code store 145). The online resource provider repeatedly queries or otherwise verifies with the authentication server 330 that the code 305a has been authenticated, and in response, links the native application 319 executing on the STB 320a to the customer account. As such, the STB 320a is authenticated and automatically signed-in to the customer account of the online streaming service based on the prior registration of the mobile device 310 as a trusted device for the customer account, and without requiring entry of a username and password, which may be especially cumbersome in the context of non-traditional computing devices such as the STB 320a. The mobile device application 315 (or an application executing on another device) may also be used to revoke the authentication of the STB 320a at any time responsive to selection of a button 335, as similarly discussed above with reference to FIG. 2.

Although illustrated in FIGS. 2 and 3 with reference to graphical codes presented as images by secondary devices 220 and 320a, it will be understood that the codes presented by the secondary devices 220 and 320a are not so limited, but rather, can include any unique identifier that can be presented by a secondary devices, including audible codes or codes presented via short-range communication (such as Bluetooth or NFC). Also, while illustrated in FIG. 3 as separate devices, it will be understood that some or all of the functionality of the STB 320a may be included or implemented within the display 320b in some embodiments. More generally, the various functionality described with reference to separate functional elements may be combined within a single functional element, and vice versa.

Example User Interface for an Online Resource

Figure 4:
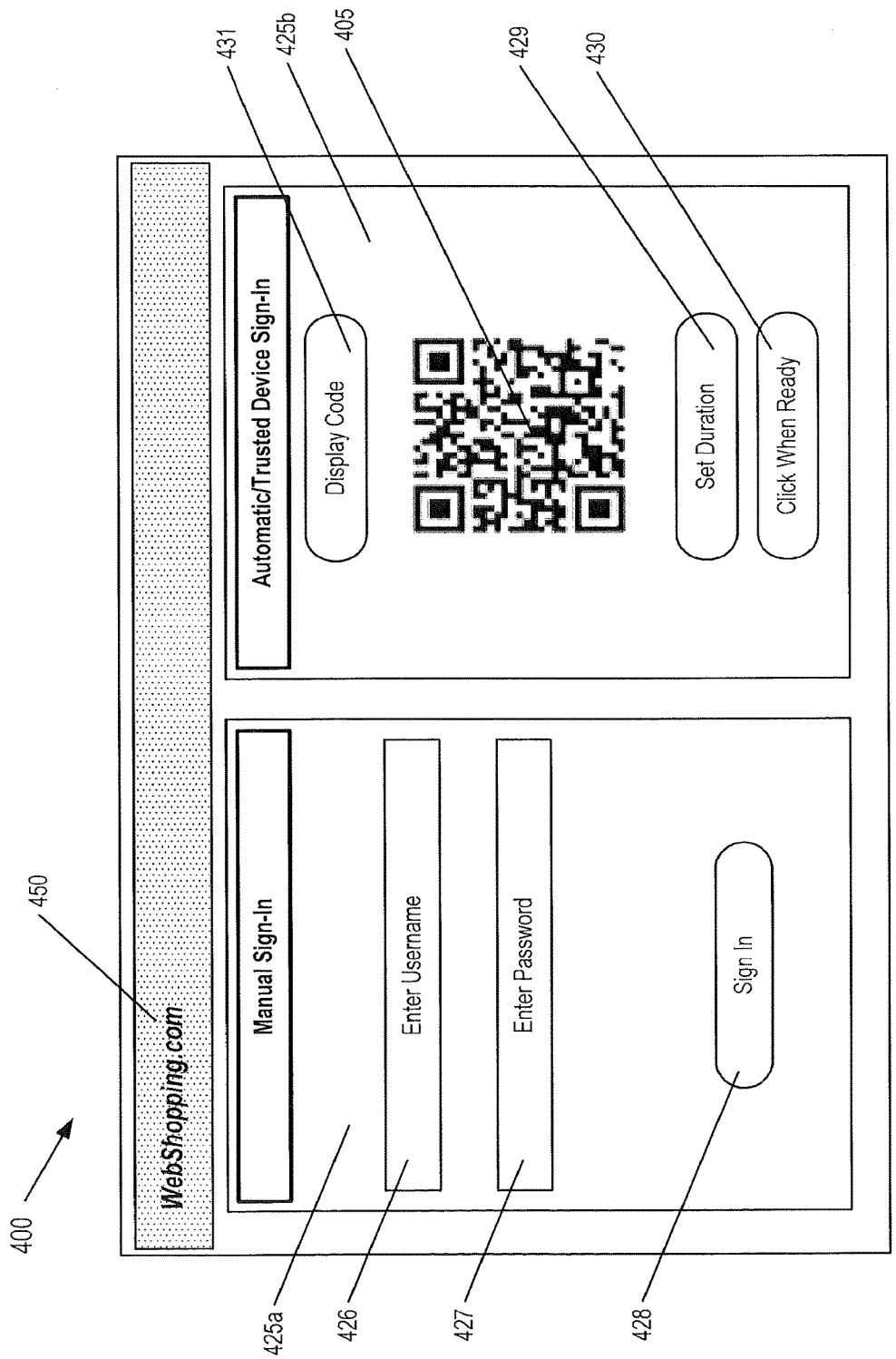
FIG. 4 illustrates a screenshot of an example user interface for authenticating a customer of an account-based online resource using a trusted device according to various embodiments described herein.

FIG. 4 is a screenshot illustrating an example user interface for authenticating a customer of an account-based online resource using a trusted device in accordance with some embodiments disclosed herein. The online resource may be accessed over a network, such as the network 140 of FIG. 1, using a web browser, a downloadable client application, or a native application executing on a secondary electronic device, such as the electronic devices 120, 220, or 320a/b of FIG. 1, 2, or 3. Referring now to FIG. 4, a user interface 400 of a web-based online resource (illustrated herein as a fictitious online shopping service called "WebShopping.com") includes a banner area 450 along an upper portion of the user interface 400 indicating the name of the service, and a manual sign-in area 425a. The manual sign-in area 425a displays fields 426 and 427 for entering a username and password, respectively, and a "sign-in" button 428 that a user can click (after entry of a username and password in the fields 426 and 427) to authenticate the user for access to the website. As such, the user interface 400 allows for authentication of a user to access the online resource by traditional password-based authentication.

Still referring to FIG. 4, the user interface 400 further includes an automatic sign-in area 425b. The automatic sign-in area 425b allows for authentication using a trusted device (such as the mobile devices 110, 210, or 310 described herein) by displaying a machine-readable code 405 (illustrated in FIG. 4 as a QR code) representing a security token. The code 405 can be scanned by a camera of a trusted device and transmitted to an authentication server, as described in detail above, to authenticate the secondary electronic device that is currently displaying the user interface 400 for access to the shopping service. In some embodiments, the code 405 may be generated and displayed on the user interface 400 responsive to clicking a button 431 indicating a desire to sign-in to the service without entry of customer identification information. For example, in response to clicking the button 431, a request to access WebShopping.com using a trusted device (e.g., without entry of a username and password in fields 426 and 427) may be transmitted to an authentication server (such as the authentication server 130 of FIG. 1), which may generate and transmit the code 405 for display in the automatic sign-in area 425b of the user interface 400.

The automatic sign-in area 425b also displays a button 429 that allows a user to set a duration of validity for the authentication of the secondary device on which the user interface 400 is displayed. In particular, by clicking on the button 429, the user interface 400 allows a user to enter an indication of a duration of time for which the present session or access to the online resource will be allowed. In some embodiments, the option 429 for setting the duration of validity for authentication of the secondary device may be provided via the trusted device, either in addition to or instead of via the user interface 400. The automatic sign-in area 425b further includes a "click when ready" button 430 that allows a user to notify a server (such as the authentication server 130 or the online resource provider 150 of FIG. 1) that the displayed code 405 has been scanned by the trusted device and has been sent to the server. For example, in response to clicking the button 430, a notification may be sent to a online resource provider (such as the online resource provider 150 of FIG. 1), which may prompt the online resource provider to verify with the authentication server that the security token included in the displayed code 405 has been authenticated. In other embodiments, however, the user interface 400 may not include the button 430, and the online resource provider may periodically (or at predetermined times) check with the authentication server to verify that the security token has been authenticated. As such, the user interface 400 may allow a user having a trusted device to access the WebShopping.com shopping service using the automatic sign-in area 425b only, without requiring entry of a username and password in fields 426 and 427. However, in other embodiments, the user interface 400 may be configured for multi-factor authentication, for example, by requiring authentication using both the manual and automatic sign-in areas 425a and 425b.

Although illustrated in FIG. 4 with reference to two sign-in areas 425a and 425b, it will be understood that user interfaces in accordance with some embodiments may include additional or fewer sign-in areas. For example, in some embodiments, only the manual sign-in area 425a may be initially displayed, and a user may have to click an on-screen button to display the automatic sign-in area 425b, or vice versa. The user interface 400 may also be configured to remember the user's preferred sign-in method, and display only the manual sign-in area 425a or the automatic sign-in area 425b in accordance therewith. Also, in instances where the mobile device or the online content to be accessed are associated with a higher level of security, the user interface 400 may display one or more additional sign-in areas (with each requiring a different type of authentication) to provide multi-factor authentication. Furthermore, while illustrated as a QR code, it will be understood that the code 405 displayed in the automatic sign-in area 425b may be displayed as a different type of graphical code, such as a one-dimensional barcode, an alphanumeric sequence, or the like. Also, in some embodiments, the code 405 may not be displayed at all, but rather, may be an audible code or a code transmitted using short-range communication, such as Bluetooth or NFC. More generally, it will be understood that the user interface 400 shown in FIG. 4 is provided for illustrative purposes only, and that user interfaces in accordance with embodiments described herein may include any and all variations that provide the functionality described herein.

Mobile Device Application Operations

Figure 5:
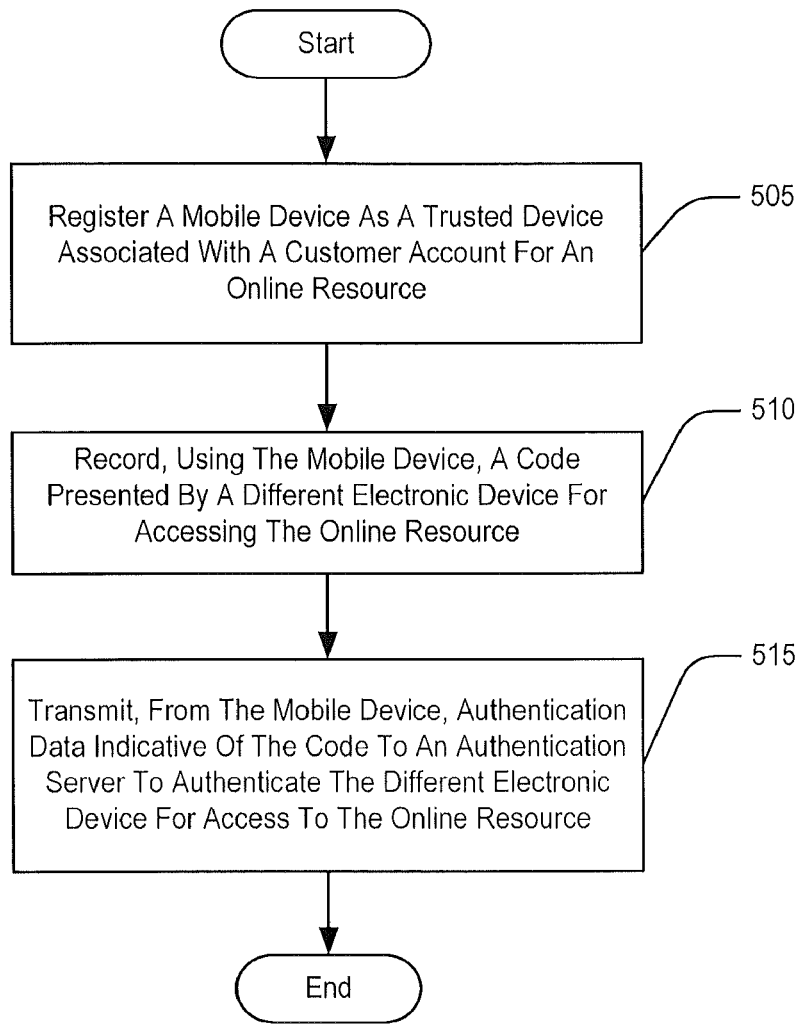
FIG. 5 is a flowchart of operations that may be performed to authenticate a customer of an account-based online resource using a trusted device according to some embodiments described herein.

FIG. 5 is a flowchart of operations for authenticating a customer of an account-based online resource using a trusted device in accordance with some embodiments. The operations of FIG. 5 may be performed by the primary device 110 of FIG. 1 or the mobile device applications 215 or 315 when executed by a processor of the mobile devices 210 or 310 of FIG. 2 or 3. Referring now to FIG. 5, a mobile device is registered as a trusted device associated with customer account for an online resource at block 505. For example, the mobile device may download a software application from an online application store, and may register or link the mobile device with one or more user accounts for online resources by following on-screen directions presented by the downloaded application.

At block 510, the mobile device is used to record a code presented by another electronic device (e.g., a secondary device) for accessing the online resource. For example, a user of the mobile device may launch the downloaded mobile application, and may scan a graphical code that is displayed by the other electronic device, for example, using a camera of the mobile device. In other embodiments, the code presented by the other electronic device may an audible code or a code transmitted using short-range communications (such as Bluetooth or near-field communication (NFC)), and may be recorded by the mobile device using a microphone or a short-range receiver. The other electronic device may be a desktop or laptop computer, a network-ready television, or a set-top box configured to link a television to a network, such as the Internet. The other electronic device may provide a larger display for accessing the online resource than the mobile device. As such, the other electronic device may be less portable than the mobile device, but may be easier to use when accessing the online resource than the mobile device, for example, due to the larger screen size.

At block 515, authentication data indicative of the code that was presented by the other electronic device is transmitted from the mobile device to an authentication server (such as the authentication server 130 of FIG. 1) in order to authenticate the other electronic device for access to the online resource. The authentication data may be generated by the mobile device based on the code that was recorded at block 510. For example, a mobile device may derive a numerical sequence from the code displayed by the other electronic device, encrypt the numerical sequence using an encryption key assigned to the mobile device by the authentication server during the registration process at block 505, and transmit the encrypted numerical sequence to the authentication server as the authentication data. The authentication data may thereby contain an indication that the code was locally recorded by the mobile electronic device, based on the encryption using the assigned key. The authentication server may therefore authenticate the other electronic device for access to the online resource without receiving a password from the other electronic device, as described in greater detail below.

Authentication Server Operations

Figure 6:
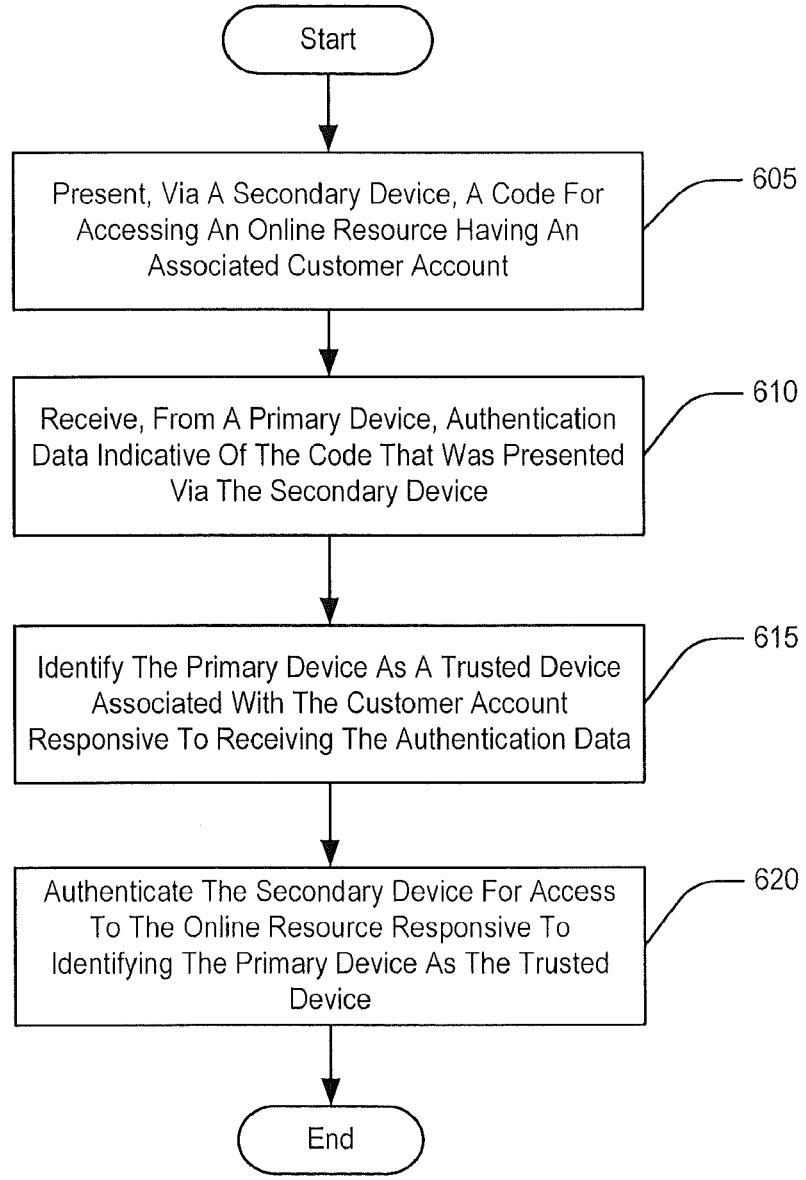
FIG. 6 is a flowchart of operations that may be performed to authenticate a customer of an account-based online resource using a trusted device according to further embodiments described herein.

FIG. 6 is a flowchart of operations for authenticating a customer of an account-based online resource using a trusted device in accordance with some embodiments. The operations of FIG. 6 may be performed by the authentication server 130, 230, or 330 described herein. Referring now to FIG. 6, a code for accessing an online resource having an associated customer account is presented via a secondary device at block 605. The code may be, for example, a graphical code, an audible code, or a code transmitted using Bluetooth or near field communication (NFC), and may represent a security token, such as a pseudo-random number (PRN) sequence. As such, the code may be presented via a display of the secondary device, a speaker of the secondary device, or a transmitter of the secondary device. The code may also indicate addressing information for an authentication server that is to perform the authentication of the secondary device, such as the authentication server 130 of FIG. 1. The secondary device may be a desktop or laptop computer, a network-ready television, or a set top box configured to connect a television to a network, such as the Internet.

At block 610, data indicative of the code that was presented via the secondary device is received from a primary device, for example, at the authentication server specified by the code. The primary device may be a mobile terminal, such as a smart phone, a tablet, an electronic book reader, or other portable electronic device. The data received from the primary device may indicate that the code displayed by the secondary device was locally captured or otherwise recorded by the primary device. For example, the data received from the primary device may be an encrypted value generated from a numerical sequence indicated by the code presented by the secondary device. Based on the received authentication data, the primary device is identified as a trusted device associated with the customer account at block 615, for example, based on a prior registration event stored in a customer account data store.

At block 620, the secondary device is authenticated for access to the online resource in response to identifying the primary device as the trusted device associated with the customer account. For example, in response to identifying the primary device as a trusted device based on the prior registration event, the security token presented in the graphical code may be marked as authenticated by an authentication server, such as the authentication server 130 of FIG. 1. An indication of the authentication of the code may be stored in a data store, such as the code store 145. An online resource provider, such as the online resource provider 150 of FIG. 1, may subsequently verify with the authentication server or the appropriate data store that the security token has been authenticated, and may thereby automatically sign-in the secondary device to the online resource. As such, the secondary device may be authenticated to access the customer account associated with the online resource without receiving a username or password from the secondary device, based on the trust associated with the primary device.

Detailed Server Operations

Figure 7:
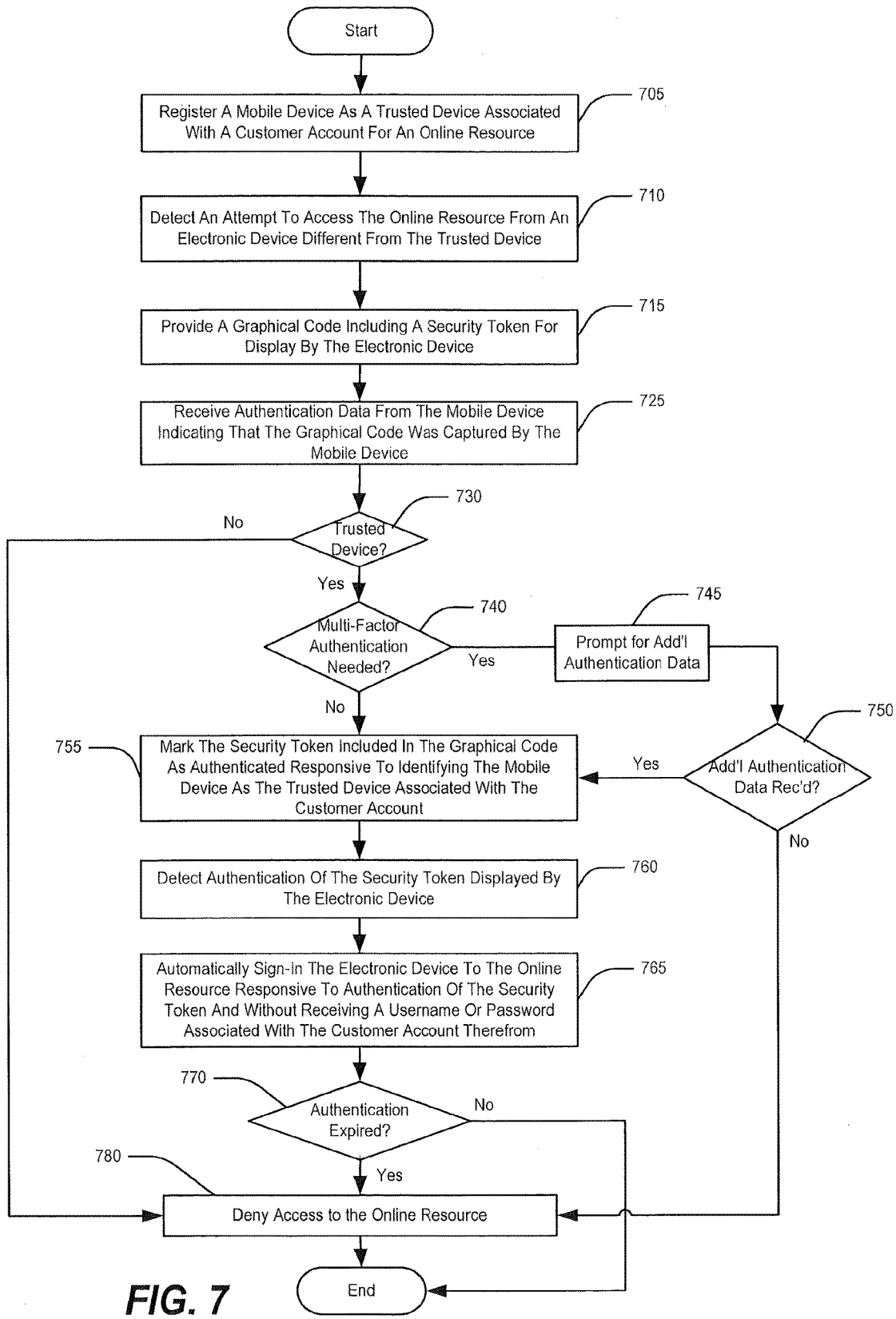
FIG. 7 is a flowchart of operations that may be performed to authenticate a customer of an account-based online resource using a trusted device according to still further embodiments described herein.

FIG. 7 is a flowchart of further operations for authenticating a customer of an account-based online resource using a trusted device in accordance with some embodiments. In some embodiments, the operations of FIG. 7 may be performed by the authentication server 130 and the online resource provider 150 described herein. Referring now to FIG. 7, a mobile device (e.g., a primary device) is registered as a trusted device associated with a customer account for an online resource at block 705. For example, a registration request including information identifying the customer account may be received from the mobile device (along with information authenticating the user of the mobile device for access to the account, such as a username and password), and the mobile device may be registered or otherwise linked with the customer account in response to the registration request. The registration information linking the mobile device to the customer account may be stored in a data store, such as the customer account store 135 of FIG. 1.

At block 710, an attempt to access the online resource by an electronic device different from the trusted device (e.g., a secondary device) is detected. For example, a message may be received from a web browser or native application executing on the other electronic device indicating that a user of the other electronic device wishes to access the online resource. In some embodiments, the message may be received as a request to access the online resource without entry of any customer identification information (such as a username and password). For example, a user of the other electronic device may click or otherwise select a "sign-in without entry of a password" button displayed via a user interface of the other electronic device, and the request may be transmitted in response to the user action.

In response to detecting the attempt to access the online resource, a graphical code including a security token therein is provided for display by the electronic device at block 715. The graphical code may represent a unique identifier, and may be generated responsive to receiving the request to access the online resource without entry of customer identification information. The graphical code may be a one-dimensional or multi-dimensional machine-readable code representing a random alphanumeric character string in some embodiments. The graphical code may also include information identifying the authentication server that is to perform the authentication of the other electronic device. After the graphical code has been displayed by the other electronic device, authentication data is received from the mobile device at block 725. The authentication data indicates that the graphical code displayed by be other electronic device was recorded or otherwise captured by the mobile device. For example, the authentication data may be an encrypted value generated from the code displayed by the other electronic device using an encryption key assigned to the mobile device during the registration at block 705. The authentication data may thereby include information indicating that code was locally recorded by the mobile device, and may be received at the authentication server based on the information identifying the authentication server provided in the graphical code.

Based on the received authentication data and the registration data stored in the data store, it is determined whether the mobile device is a trusted device associated with the customer account at block 730. For example, the authentication data may include information identifying the mobile device, and a lookup table stored in the data store may be accessed to identify the mobile device as a trusted device for the customer account. If the mobile device is not identified as a trusted device at block 730, the other electronic device is denied access to the online resource at block 780. In some embodiments, the other electronic device may re-prompt the user to enter a username and password at this time, e.g., so as to revert to traditional password-based authentication upon failure of the automatic trusted device-based authentication.

However, if the mobile device is identified as a trusted device at block 730, it is determined at block 740 whether any additional authentication factors are needed. In particular, depending on the level of security associated with the customer account to be accessed, more than one authenticating factor may be required. For example, the number of authentication factors required to access a user's bank account may be greater than that required to access a user's streaming music or movie accounts. Likewise, the number of required authenticating factors may depend on a level of trust associated with the mobile device. For example, a personal mobile phone may require more instances of authentication data to access a business or corporate account than a mobile phone issued by the business or corporation. If it is determined at block 740 that additional authentication factors are needed, a prompt for additional authentication data is provided via a display of the mobile device or a display of the other electronic device at block 745. If it is determined that the additional authentication data has not been received at block 750, the mobile device is denied access to the online resource at block 780.

If, however it is determined that no additional authentication factors are needed at block 740, or if the additional authentication data is received at block 750, the security token presented in the graphical code displayed by the other electronic device is marked as authenticated at block 755 in response to identifying the mobile device as a trusted device. Authentication of the security token is thereby detected at block 760. For example, the authentication of the security token may be detected by the online resource provider (such as the online resource provider 150) by periodically checking or otherwise verifying the status of the security token with the authentication server (such as the authentication server 130). In response to detecting authentication of the security token at block 760, the other electronic device is automatically signed-in to the online resource without receiving a username or password associated with the customer account at block 765. For example, the online resource provider may transmit a cookie including an authentication state to the web browser executing on the other electronic device to sign-in the device to the online resource.

At block 770, it is determined whether a duration of validity of the authentication of the other electronic device has expired. For example, an indication of a duration of time (for which access to the online resource is permitted) may be received from the mobile device (or from the other electronic device), and it may be determined whether the authentication has expired based on a timer. In addition or alternatively, a notification may be received from the mobile device revoking the access of the other electronic device to the online resource. Should either event occur, the other electronic device is denied access to the online resource at block 780. As such, the trusted, primary mobile device may retain some control of access to the customer account by the other secondary device even after access to the account has been granted.

Accordingly, embodiments described herein provide methods, systems, devices, and computer program products that allow a secondary device to access a customer account responsive to receiving authenticating information from a primary, trusted device that is already associated with the customer account, without requiring customer identification information from the secondary device. Thus, these embodiments can reduce or eliminate problems that may be associated with password-based authentication, from both a convenience and a security standpoint.

Various embodiments have been described fully herein with reference to the accompanying figures, in which various embodiments are shown. This disclosure may, however, be embodied in many alternate forms and should not be construed as limited to the embodiments set forth herein.

Accordingly, while the disclosure is susceptible to various modifications and alternative forms, specific embodiments thereof are shown by way of example in the drawings and were described in detail herein. It should be understood, however, that there is no intent to limit the disclosure to the particular forms disclosed, but on the contrary, the disclosure is to cover all modifications, equivalents, and alternatives falling within the spirit and scope of the disclosure as defined by the claims. Like numbers refer to like elements throughout the description of the figures.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises," "comprising," "includes," "including," "have," "having" or variants thereof when used herein, specify the presence of stated features, integers, steps, operations, elements, and/or components, but do not preclude the presence or addition of one or more other features, integers, steps, operations, elements, components, and/or groups thereof. Moreover, when an element/step is referred to as being "responsive" to another element/step (and variants thereof), it can be directly responsive to the other element/step, or intervening elements/steps may be present. In contrast, when an element/step is referred to as being "directly responsive" to another element/step (and variants thereof), there are no intervening elements/steps present.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element without departing from the teachings of the disclosure. Moreover, although some of the diagrams include arrows on communication paths to show a primary direction of communication, it is to be understood that communication may occur in the opposite direction to the depicted arrows.

Various embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s)

These computer program instructions may also be stored in a computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/Blu-Ray).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks.

Accordingly, the present disclosure may be embodied in hardware and/or in software (including firmware, resident software, micro-code, etc.) that runs on a processor such as a digital signal processor, which may collectively be referred to as "circuitry," "a module," "an engine," or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated.

Unless otherwise defined, all terms used herein have the same meaning as commonly understood by one of ordinary skill in the art to which this invention belongs. As used herein, the terms "present" or "provide" may refer to operations for transmitting data from one device to another, or to operations for displaying the data on an electronic device for viewing by a user. As used herein, a "wireless communication terminal" includes, but is not limited to, a device that is configured to receive/transmit communication signals via a wireless interface with, for example, a cellular network, a wireless local area network (WLAN), a satellite network, and/or another communication terminal. A wireless communication terminal may also be referred to as a "mobile terminal." Examples of wireless communication devices include, but are not limited to, a satellite or cellular radiotelephone or "smartphone" that can include a radiotelephone, Internet/intranet access, Web browser, and/or a global positioning system (GPS) receiver; and a conventional laptop and/or palmtop computer or other appliance that includes a radio transceiver.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of all combinations and subcombinations of the embodiments described herein, and of the manner and process of making and using them, and shall support claims to any such combination or subcombination.

In the drawings and specification, there have been disclosed embodiments of the disclosure and, although specific terms are employed, they are used in a generic and descriptive sense only and not for purposes of limitation, the scope of the disclosure being set forth in the following claims.

That which is claimed:

1. A method comprising:
   receiving, by a network server, a request to access a streaming media service from an electronic media device;
   transmitting, by the network server, a code to the electronic media device for display;
   receiving, by the network server from a mobile device, a copy of the code or authentication data derived from the code, wherein the mobile device is different from the electronic media device;
   authenticating, by the network server, the mobile device as being associated with a user account for the streaming media service and as having a requisite trust level required for accessing the streaming media service, wherein the electronic media device is not associated with the requisite trust level; and
   granting, by the network server, permission to access the streaming media service to the electronic media device after authentication of the mobile device by automatically signing in the electronic media device to the streaming media service responsive to authentication of the mobile device.

2. The method of claim 1, wherein the electronic media device comprises a set top box for accessing the streaming media service.

3. The method of claim 1, wherein the electronic media device is coupled to an external display.

4. The method of claim 1, wherein the code comprises a Quick Response (QR) code.

5. The method of claim 1, wherein the code comprises an alphanumeric sequence.

6. A method comprising:
   transmitting, by a network server, a code to an electronic device for presentation, wherein the electronic device is associated with a user account for a network service;
   receiving, by the network server from a mobile device, a copy of the code or authentication data derived from the code, wherein the mobile device is different from the electronic device, wherein the mobile device is associated with the user account for the network service and the mobile device is associated with a first trust level that is above a trust level associated with the electronic device;
   authenticating, by the network server, the mobile device as being associated with the user account for the network service; and
   granting, by the network server, permission to access the network service to the electronic device after authentication of the mobile device by automatically signing in the electronic device to the network service responsive to authentication of the mobile device, wherein the network service requires authentication from a device associated with the user account at the first trust level or higher before permission is granted to access the network service.

7. The method of claim 6, wherein the electronic device comprises a set top box for accessing a streaming media service.

8. The method of claim 6, wherein the code comprises a Quick Response (QR) code.

9. The method of claim 6, wherein the code comprises an alphanumeric sequence.

10. The method of claim 6, wherein the electronic device comprises a point-of-sale terminal.

11. The method of claim 10, wherein the point-of-sale terminal comprises a parking meter.

12. The method of claim 6, wherein the network service comprises an online shopping service.

13. The method of claim 6, further comprising automatically signing-in the electronic device for the user account for the network service.

14. The method of claim 6, further comprising encrypting a security token within the code before transmission of the code to the electronic device.

15. The method of claim 6, wherein the electronic device presents the code via short-range communication.

16. A system comprising:
   at least one computing device; and
   an application stored in memory and executable on the at least one computing device, the application configured to at least:
      assign a mobile device associated with a user account for a network service at a first trust level for the network service;
      receive a request from an electronic device to access the network service, wherein the electronic device is associated with a trust level for the network service that is below the first trust level, wherein permission to access the network service is granted after providing authentication of the first trust level or higher for the network service;

transmit a code to the electronic device, wherein the electronic device provides the code for presentation;

receive a copy of the transmitted code or authentication data derived from the transmitted code from the mobile device;

verify that the mobile device is associated with at least the first trust level; and grant permission to access the network service to the electronic device after successful authentication of the mobile device as being associated with at least the first trust level for the network service by automatically signing in the electronic device to the network service responsive to authentication of the mobile device.

17. The system of claim 16, wherein the mobile device comprises a wireless communication terminal.

18. The system of claim 17, wherein the wireless communication terminal comprises a smartphone or a tablet.

19. The system of claim 16, wherein the electronic device comprises a desktop computer or a laptop computer.

20. The system of claim 16, wherein the electronic device comprises a network-ready television or a set-top box.

* * * * *